United States Patent
Lee et al.

(10) Patent No.: US 7,579,099 B2
(45) Date of Patent: Aug. 25, 2009

(54) FUEL CELL HAVING HEAT EXCHANGER BUILT IN STACK

(75) Inventors: Seung-jae Lee, Seongnam-si (KR); Tae-won Song, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 85 days.

(21) Appl. No.: 11/514,251

(22) Filed: Sep. 1, 2006

(65) Prior Publication Data
US 2007/0287045 A1    Dec. 13, 2007

(30) Foreign Application Priority Data
Jun. 9, 2006    (KR) .................. 10-2006-0051986

(51) Int. Cl.
*H01M 8/04* (2006.01)
*H01M 2/00* (2006.01)
*H01M 2/14* (2006.01)

(52) U.S. Cl. ................ 429/26; 429/34; 429/24; 429/38; 429/39

(58) Field of Classification Search .......... None
See application file for complete search history.

(56) References Cited

U.S. PATENT DOCUMENTS

| | | | | |
|---|---|---|---|---|
| 5,677,073 A | * | 10/1997 | Kawatsu | 429/22 |
| 5,863,672 A | * | 1/1999 | Ledjeff et al. | 429/26 |
| 6,673,482 B2 | * | 1/2004 | Imazeki et al. | 429/26 |
| 7,070,874 B2 | * | 7/2006 | Blanchet et al. | 429/26 |
| 2002/0009648 A1 | * | 1/2002 | Buchner et al. | 429/254 |
| 2004/0166388 A1 | * | 8/2004 | Wheat et al. | 429/24 |
| 2005/0130002 A1 | * | 6/2005 | Kuriiwa et al. | 429/25 |

OTHER PUBLICATIONS

Korean Office Action issued May 29, 2007 by the Korean Intellectual Property Office re: Korean Patent Application No. 2006-51986 (2 pp).

* cited by examiner

*Primary Examiner*—Patrick Ryan
*Assistant Examiner*—Angela Martin
(74) *Attorney, Agent, or Firm*—Stein, McEwen & Bui, LLP

(57) ABSTRACT

A fuel cell having a heat exchanger that has a structure suitable for reducing space occupancy of the fuel cell. The fuel cell includes a stack where a chemical reaction for transforming chemical energy of a fuel into electricity occurs and a heat exchanger that removes heat generated during the energy transformation process in the stack, wherein the heat exchanger is built in at least one plate mounted on the stack. Therefore, the occupancy of the fuel cell can be reduced to be approximately half of a conventional externally mounted type heat exchanger.

19 Claims, 6 Drawing Sheets

FUEL CELL HAVING HEAT EXCHANGER BUILT IN STACK

CROSS-REFERENCE TO RELATED PATENT APPLICATIONS

This application claims the benefit of Korean Patent Application No. 2006-51986, filed Jun. 9, 2006, in the Korean Intellectual Property Office, the disclosure of which is incorporated herein in its entirety by reference.

BACKGROUND OF THE INVENTION

1. Field of the Invention

Aspects of the present invention relate to a fuel cell, and more particularly, to a fuel cell including a stack with a built-in heat exchanger having a structure to advantageously reduce space occupancy of the fuel cell.

2. Description of the Related Art

In general, a fuel cell is an apparatus that directly transforms chemical energy of a fuel into electrical energy through a chemical reaction. A fuel cell can be described as a type of electric generator that can generate electricity as long as fuel is supplied.

FIG. 1 is a schematic drawing showing the principle of generating electricity from a typical fuel cell, FIG. 2 is a perspective view of a conventional fuel cell stack having a heat exchanger located external to the conventional fuel cell stack, and FIG. 3 is an exploded perspective view showing a configuration of material circulation parts of a unit cell 10 included in a stack of fuel cells. Referring to FIG. 1, electricity is generated by a reverse reaction of electrolysis of water through an electrolyte membrane 2 when air containing oxygen is supplied to a cathode electrode 1 and hydrogen is supplied to an anode electrode 3. However, the electrical voltage generated from a unit cell 10 is generally not high enough to be useful. Therefore, as depicted in FIG. 2, a plurality of unit cells 10 are arranged in a stack 20 in which the plurality of unit cells 10 are connected in series. As depicted in FIG. 3, surface flow channels 4a are included in each cell 10 stacked in the stack 20 to supply hydrogen and oxygen to each respective anode electrode 3 and cathode electrode 1 and recover the oxygen and hydrogen. Accordingly, as depicted in FIG. 2, when hydrogen or oxygen is supplied through an end plate 21 of the stack 20, corresponding fuel materials are circulated to each of the electrodes through respective flow channels of each cell 10 and exhaust material are carried away. As described above, hydrogen is supplied as a chemical fuel, and oxygen is supplied from the air. Exhaust materials may be water, carbon dioxide, and unreacted fuel.

During the electrochemical reaction, heat is generated as well as electricity. Therefore, smooth operation of a fuel cell requires heat to be continuously removed from the cells. For this purpose, a heat exchanger 30 as shown in FIG. 2 is provided externally, in conjunction with the fuel cell, and cooling plates 5 for passing cooling water for exchanging heat energy are formed in every fifth or sixth unit cell 10 in the stack 20. Accordingly, the cooling water absorbs heat from the stack 20 while passing through flow channels 5a (see FIG. 3) of the cooling plates 5. The cooling water that absorbed heat is cooled in the heat exchanger 30 by secondary cooling water, and is then re-circulated to the stack 20. At this time, the circulation of the cooling water is achieved by natural convection of boiling water that has absorbed heat from surroundings in the fuel cell stack 20 and not by an additional circulation force. Reference numeral 40 denotes a thermosensor that measures the temperature of cooling water entering into the heat exchanger 30, and reference numeral 50 denotes a solenoid valve that opens and closes a flow channel from the heat exchanger 30 to the stack 20. During normal operation, the solenoid valve 50 is opened to allow the circulation of cooling water, but when the temperature of the cooling water entering into the heat exchanger 30 is too low, the solenoid valve 50 closes the flow channel so that the temperature of the cooling water in the stack 20 can increase. Afterward, the solenoid valve 50 is opened when the temperature of the cooling water in the stack 20 has increased to a desired level. The opening and closing of the solenoid valve 50 is automatically controlled by a controller (not shown).

However, in a conventional fuel cell structure, the stack 20 and the heat exchanger 30 are mounted separately. Therefore, the overall volume of the fuel cell is large, and thus occupies a large space. That is, space required for mounting a fuel cell in an apparatus that uses the fuel cell is increased since the stack 20 and the heat exchanger 30 which respectively occupy separate spaces are both required. This is a drawback of the application of conventional fuel cells. Also, flow channel lengths for the cooling water are increased according to an increase in the volume of the conventional fuel cell, thereby increasing heat loss. This results in loss of the waste heat generated during the electricity production of the fuel cell for secondary purposes as well. Therefore, there is a need to develop a fuel cell having a new cooling system that has a compact structure to overcome the above and/or other disadvantages.

SUMMARY OF THE INVENTION

Aspects of the present invention provide a fuel cell that has a reduced space occupancy and can smoothly perform cooling and electricity generation functions.

According to an aspect of the present invention, there is provided a fuel cell comprising a stack where a chemical reaction to transform chemical energy of a fuel into electricity occurs and a heat exchanger that removes heat generated during the energy transformation process in the stack, wherein the heat exchanger is installed in one or more plates mounted in the stack.

While not required in all aspects, the heat exchanger may be installed in at least one of a pair of end plates disposed on ends of the stack.

While not required in all aspects, the heat exchanger may comprise: a cooling water storage to temporarily store cooling water that is circulated in the stack; and a second cooling water flow channel that passes through the cooling water storage and through which a second cooling water passes to absorb heat from the cooling water storage.

While not required in all aspects, the heat exchange plate may comprise, a cooling water storage to temporarily store cooling water that is circulated in the stack, and a second cooling water flow channel that passes through the cooling water storage and through which a second cooling water for exchanging heat with the cooling water passes.

While not required in all aspects, the cooling water storage may comprise a first cooling water storage through which the second cooling water flow channel passes, a second cooling water storage that stores cooling water cooled by contacting the second cooling water flow channel, and a solenoid valve that selectively opens and closes a flow channel connecting the first and second cooling water storages.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
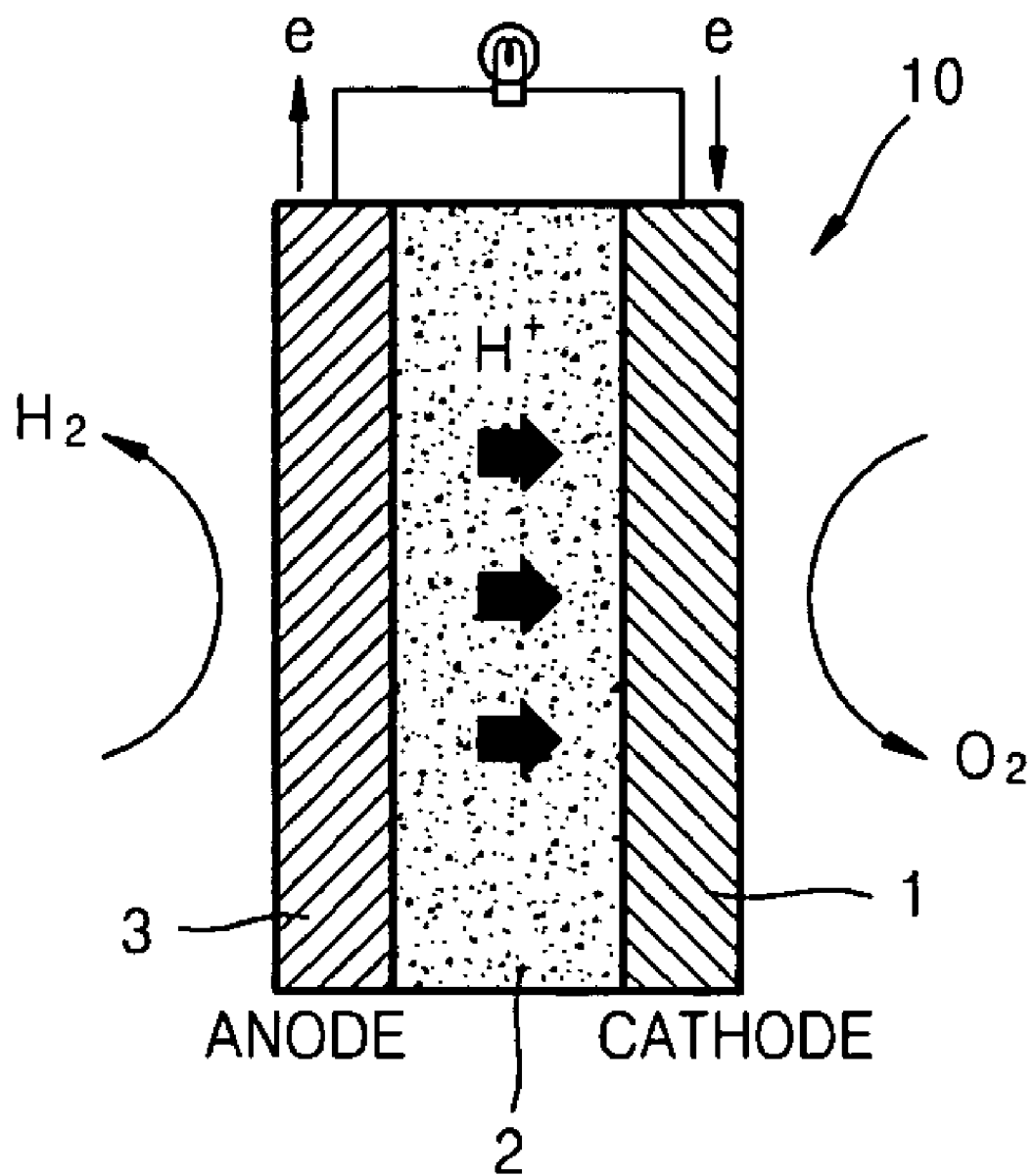
FIG. 1 is a schematic drawing showing the principle of generating electricity from a typical fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
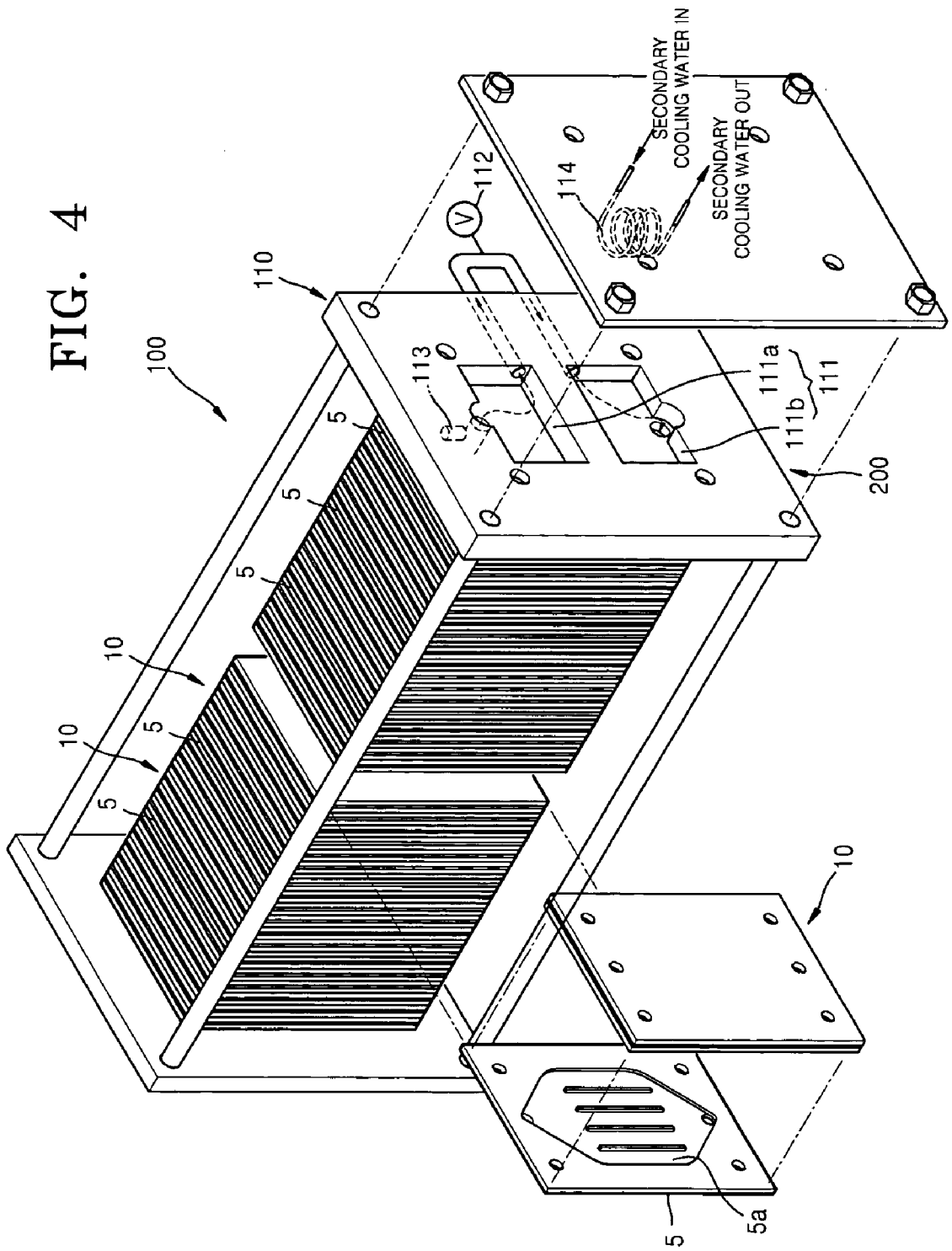
FIG. 4 is a perspective view of a fuel cell having a built-in heat exchanger according to an embodiment of the present invention.

FIG. 4 is a perspective view of a fuel cell having a built-in heat exchanger according to an embodiment of the present invention. Referring to FIG. 4, a fuel cell according to an embodiment of the present invention includes a stack 100 in which a plurality of unit cells 10 where a chemical reaction that transforms chemical energy of a fuel into electrical energy are connected in series. Cooling plates 5 having a plurality of flow channels through which cooling water passes are installed in various positions in the stack 100. The cooling water that passes through the cooling plates 5 absorbs heat generated from the energy transformation process. One cooling plate 5 may be installed for every unit cell 10, or one cooling plate 5 may be installed for every two or more unit cells, such as one cooling plate 5 installed for every 5-6 unit cells 10 as shown in the embodiment of FIG. 4. A heat exchanger 200 that circulates the cooling water to the cooling plates 5 after cooling the heat-absorbed cooling water is installed in an end plate 110 advantageously mounted on an end of the stack 100 and not installed outside of the stack 100 as in the conventional art. The detailed structure is as follows.

A cooling water storage 111 that is connected to flow channels 5a of the cooling plates 5 is provided in the end plate 110. The cooling water storage 111 is a space containing a cooling fluid such as water provided on a surface of the end plate 110 by forming grooves therein, and includes a first cooling water storage 111a where the heat-absorbed cooling water is cooled by exchanging heat energy with a secondary cooling water and a second cooling water storage 111b where the cooled cooling water is stored. A solenoid valve 112 is installed between the first and second cooling water storages 111a and 111b. The solenoid valve 112 is controlled so that, when the solenoid valve 112 is opened, the cooling water in the first cooling water storage 111a is circulated to the cooling plates 5 in the stack 100 through the second cooling water storage 111b, but when the solenoid valve 112 is closed, the circulation is temporarily stopped.

Reference numeral 114 denotes a flow channel of secondary cooling water for exchanging heat with the cooling water of the first cooling water storage 111a. The secondary cooling water exchanges heat with the cooling water of the first cooling water storage 111a while passing through the flow channel 114.

When the fuel cell having a heat exchanger 200 built in the end plate 110 is operated, a chemical reaction for transforming chemical energy of a fuel into electrical energy occurs in each of the unit cells 10 of the stack 100. At this time, the cooling water cools the stack 100 by absorbing heat generated from the energy transforming reaction while being circulated through the cooling plates 5. The heat-absorbed cooling water enters into the first cooling water storage 111a of the cooling water storage 111 provided in the end plate 110, and is cooled by contacting the secondary cooling water. When the solenoid valve 112 is open, the cooled cooling water enters into the second cooling water storage 11b and is circulated through the cooling plates 5. However, when a thermo-sensor 113 detects that the temperature of the cooling water entering into the first cooling water storage 111a is too low, a control valve (not shown) closes the solenoid valve 112 to stop the circulation temporarily. When the cooling water temperature increases to a predetermined temperature as the temperature in the stack 100 increases, the cooling water is circulated through the cooling plates 5 by opening the solenoid valve 112.

Figure 2:
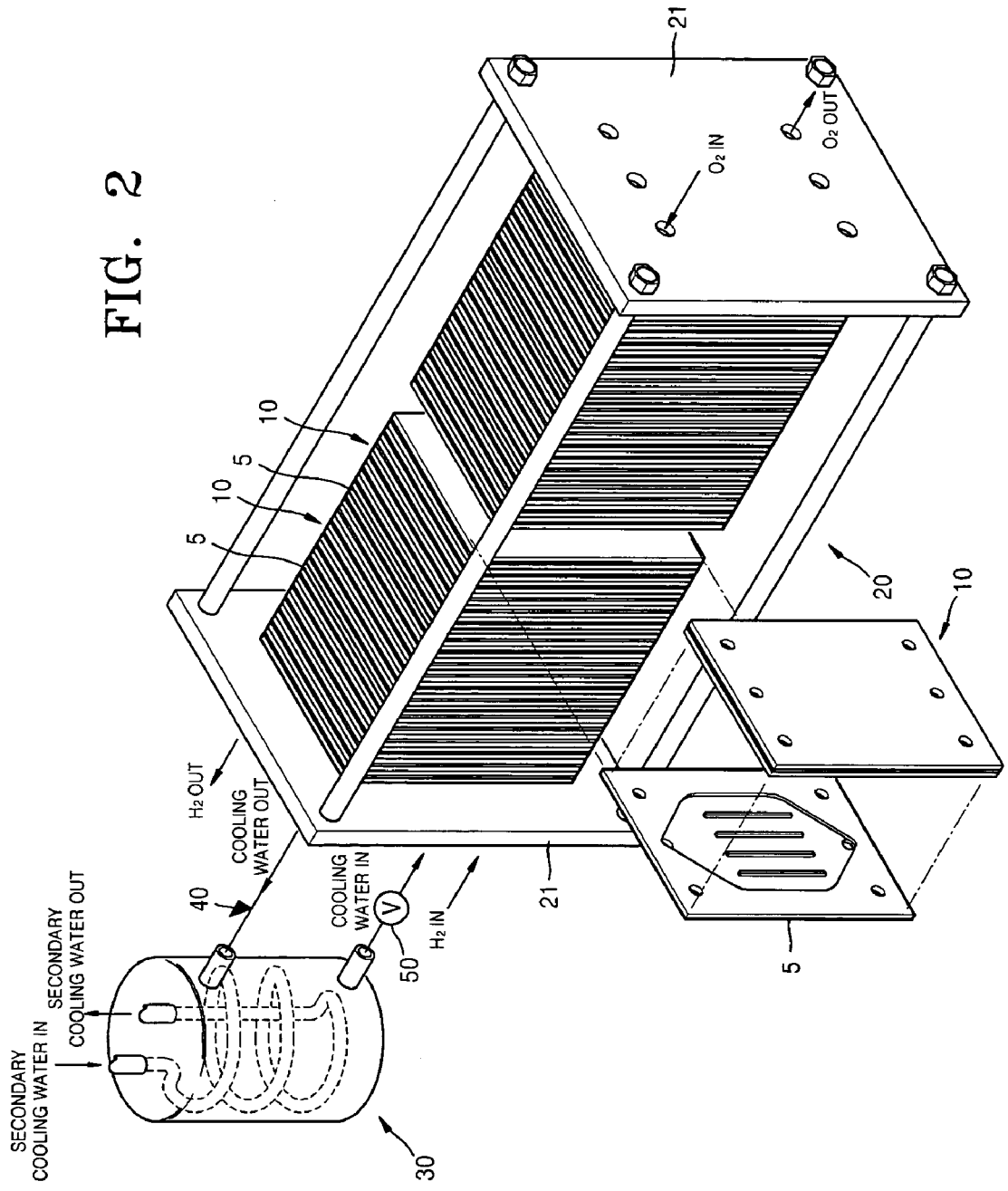
FIG. 2 is a perspective view of a conventional fuel cell having an external heat exchanger.
Figure 3:
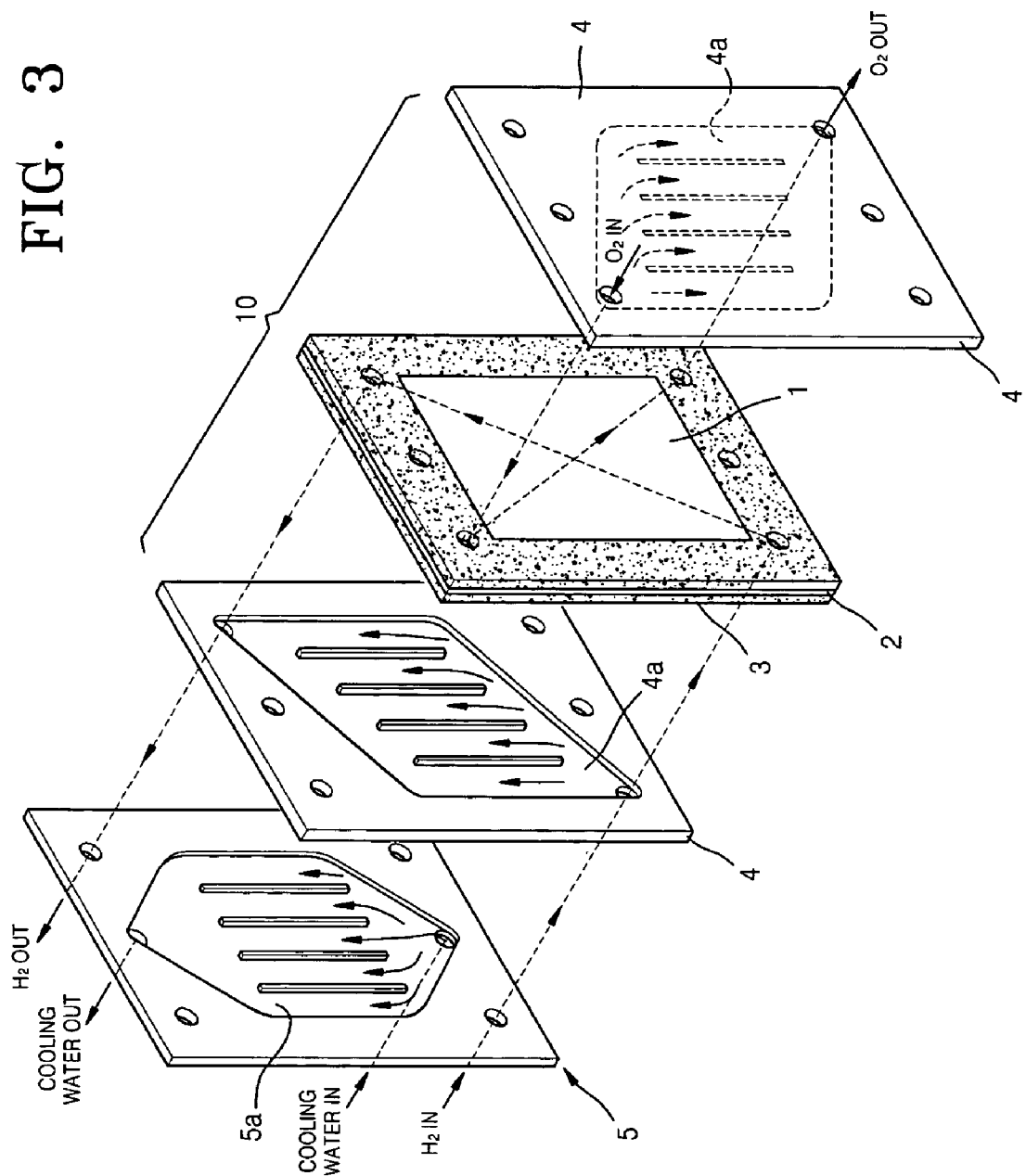
FIG. 3 is an exploded perspective view showing a configuration of material circulation parts of a unit cell included in a stack of a fuel cell.

A fuel cell having the above structure can greatly reduce the space occupied by the fuel cell when compared to a conventional fuel cell since the heat exchanger 200 is not an additional apparatus to the fuel cell but is built in the end plate 110 of the stack 100. Considering that typically a stack and a heat exchanger have similar dimensions that are nearly the same size, the realization of the heat exchanger 200 built-in the stack 100 can reduce the occupancy by approximately 50%. Also, there is no significant difference in heat transfer capacity from a fuel cell having a conventional externally mounted type heat exchanger. The following Table 1 compares cooling water temperature, amount of electricity generated, and heat recovery measurements between a conventional externally mounted type heat exchanger 30 (as shown in FIG. 2) and the built-in type heat exchanger 200 according to an embodiment of the present invention.

TABLE 1

| Items | Conventional (externally mounted type heat exchanger) | Present Invention (built-in type heat exchanger) |
|---|---|---|
| Temperature of cooling water at inlet of heat exchanger (° C.) | 151.3 | 150.7 |
| Temperature of cooling water at outlet of heat exchanger (° C.) | 147.5 | 60.8 |
| Temperature of secondary cooling water at inlet of heat exchanger (° C.) | 22.8 | 23.2 |
| Temperature of cooling water at outlet of heat exchanger (° C.) | 63.2 | 68.7 |
| Flowrate of secondary cooling water (lpm) | 0.17 | 0.18 |
| Electricity generation (W) | 605 | 605 |
| Heat recovery (W) | 480.76 | 573.3 |
| Heat loss (W) | 124.24 | 31.7 |

Referring to Table 1, when the fuel cells are operated to obtain the same amount of electricity generation, it is seen that the built-in type heat exchanger according to an embodiment of the present invention shows superior heat exchange capacity relative to the conventional externally mounted type heat exchanger with reference to the heat recovery and heat loss data thereof. Because the built in type heat exchanger 200 is built having the stack 100 and heat exchanger 200 in one unit, the length of the flow channels is reduced thus reducing unwanted heat loss. Accordingly, a fuel cell having a reduced volume and superior heat exchange capacity is realized.

Referring to FIG. 4, the fuel cell includes one heat exchanger 200 in one of the two end plates 110 disposed on both sides of the stack 100, but the present invention is not limited thereto. That is, the heat exchanger 200 can be installed on both end plates 110 or two heat exchangers 200 can be respectively installed on both end plates. Also, a space provided on a surface of the end plate 110 by forming grooves can be used as the cooling water storage 111 or a space provided on the other surface of the end plate 110 can be used as the cooling water storage 111. Further, a space provided on a surface of the end plate 110 by forming grooves can be used as the first cooling water storage 111a and a space provided on a surface of the other end plate 110 can be used as the second cooling water storage 111b. These are alternative embodiments within the scope of the present invention.

Figure 5:
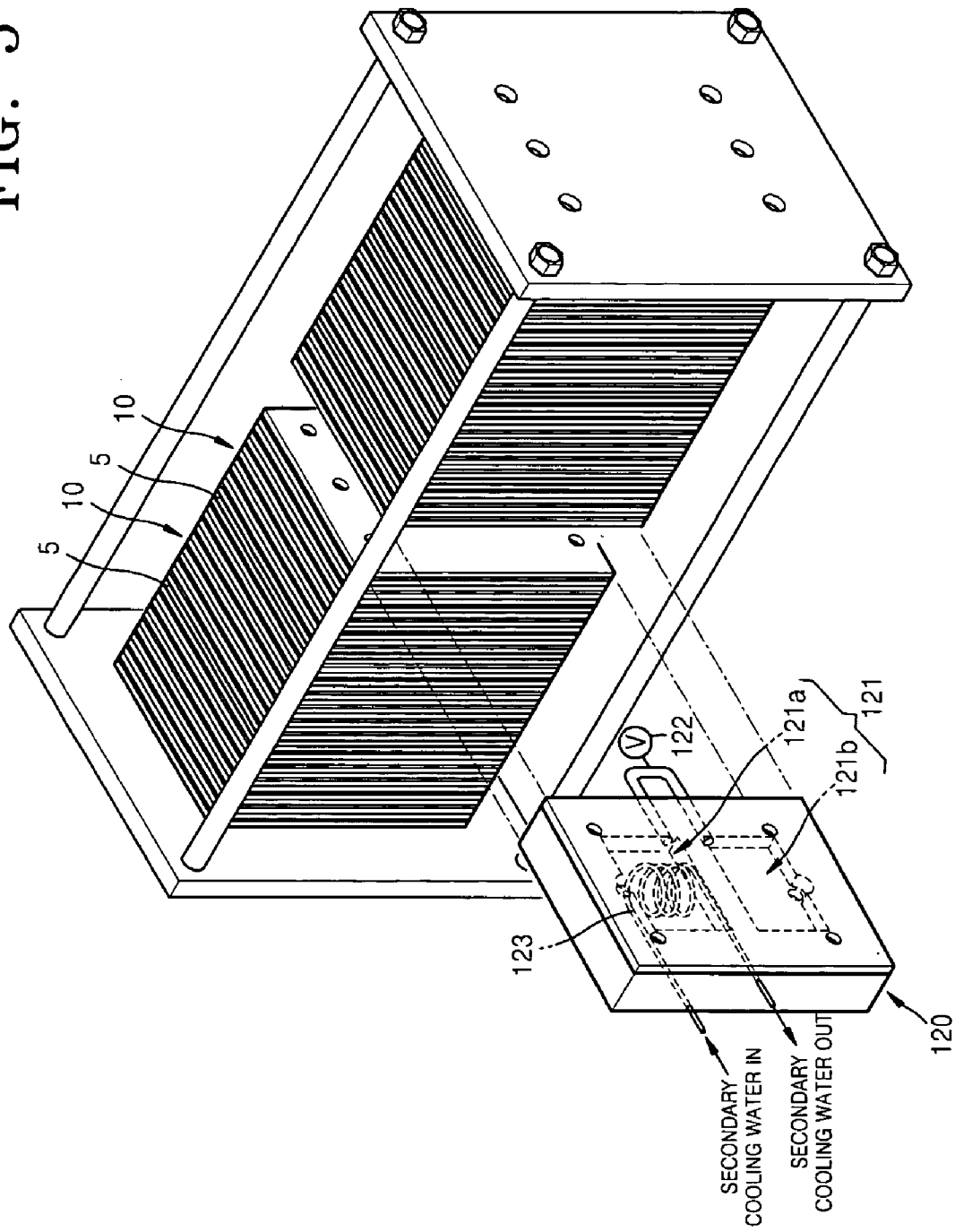
FIG. 5 is a perspective view of a fuel cell having a built-in heat exchanger according to another embodiment of the present invention.

In the above embodiments, the conventional end plate 110 is used as an element of the housing of the heat exchanger 200. However, a heat exchanger can be innovatively configured by forming an additional heat exchange plate 120 in the stack 100. FIG. 5 is a perspective view of a fuel cell having a built-in heat exchanger according to another embodiment of the present invention. As depicted in FIG. 5, the heat exchange plate 120 having a cooling water storage 121 that includes first and second cooling water storages 121a and 121b and a solenoid valve 122 for connecting flow channels can be installed in the center of the stack 100 where unit cells 10 are arranged so that cooling water that has absorbed heat from the stack 100 can exchange heat with secondary cooling water at a secondary cooling water channel 123 while being circulated through the cooling water storage 121 of the heat exchange plate 120. Also in this case, since the heat exchanger is built in the stack 100, a space reducing effect almost equal to the previous embodiment can be obtained although the heat exchange plate 120 is added.

Figure 6A:
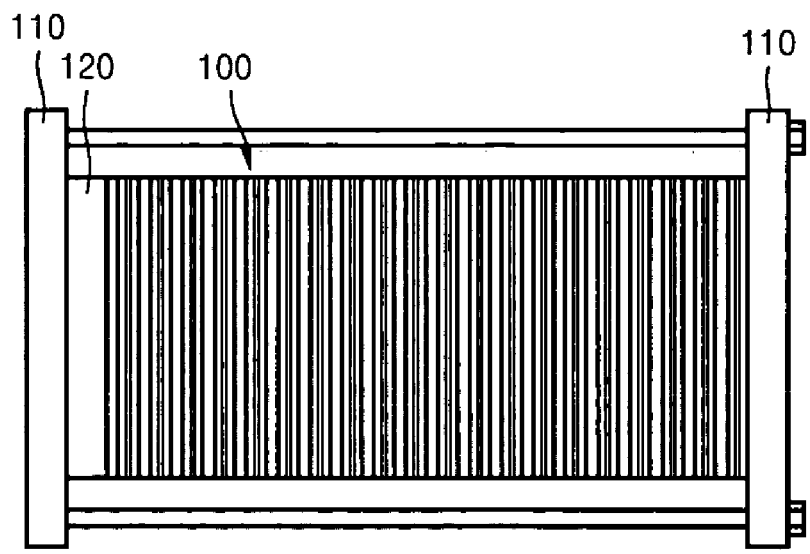
FIGS. 6A and 6B are cross-sectional views of fuel cells having built-in heat exchangers according to other embodiments of the present invention.
Figure 6B:
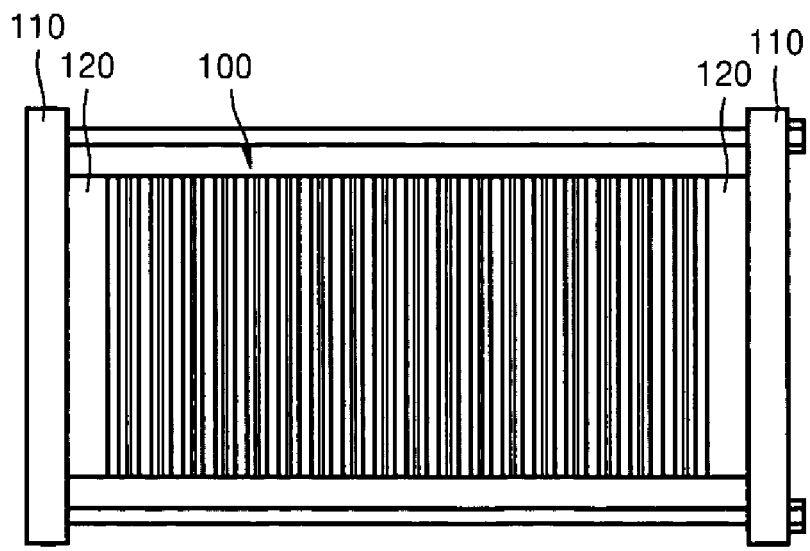

Besides the above configuration, the heat exchange plate 120 can be disposed on an end of the stack 100 close to an end plate 110 as depicted in FIG. 6A, or can be disposed on both ends of the stack 100 as depicted in FIG. 6B. Both cases are examples of fuel cells in which the heat exchanger is built in the stack 100. Furthermore, multiple heat exchange plates 120 may be at various locations throughout the fuel cell to remove waste heat from the fuel cell. In addition, the heat exchange plates may be of variable thicknesses depending on the heat output of the fuel cell to minimize extra length of the stack. When a configuration of these structures is appropriately employed, a fuel cell that has a reduced space occupancy and can perform electricity generation and cooling efficiently can be realized.

A fuel cell according to aspects of the present invention has the following advantages. First, an installation space of the fuel cell according to the present invention is approximately 50% less than a conventional fuel cell having an externally mounted type heat exchanger. Second, a flow channel length of cooling water is reduced, thereby enabling heat insulation and reducing heat loss. Third, manufacture and assembly are less complicated and thus less costly since the fuel cell according to the present invention has a simple structure.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell comprising:
   a stack where a chemical reaction for transforming chemical energy of a fuel into electricity occurs; and
   a heat exchanger installed in at least one plate mounted in the stack that removes heat generated during the energy transformation process in the stack, wherein the plate where the heat exchanger is installed comprises:
      a cooling water storage to temporarily store a first cooling water that is circulated in the stack; and
      a second cooling water flow channel that passes through the cooling water storage in the end plate and through which a second cooling water passes in the plate to exchange heat with the first cooling water.

2. The fuel cell of claim 1, wherein the plate where the heat exchanger is installed is at least one of a pair of plates disposed on ends of the stack.

3. The fuel cell of claim 1, wherein the cooling water storage is a space on a surface of the plate formed by grooves.

4. The fuel cell of claim 2, wherein the cooling water storage comprises:
   a first cooling water storage through which the second cooling water flow channel passes;
   a second cooling water storage that stores first cooling water cooled by contacting the second cooling water flow channel; and
   a solenoid valve that selectively opens and closes a flow channel connecting the first and second cooling water storages.

5. The fuel cell of claim 4, wherein
   the first cooling water storage is located in one of the pair of end plates of the fuel cell; and
   the second cooling water storage is located in the other of the pair of end plates of the fuel cell.

6. The fuel Cell of claim 4, further comprising:
   a thermo sensor to measure the temperature of cooling water entering into the heat exchanger; and
   a controller to control the solenoid valve to close the valve when the temperature of the cooling water entering into the heat exchanger is below a first temperature and open the valve when the temperature of the cooling water in the stack is above a second temperature higher than the first temperature.

7. The fuel cell of claim 1, wherein the plate where the heat exchanger is installed is a heat exchange plate installed between plates disposed on ends of the stack.

8. The fuel cell of claim 7, wherein the heat exchange plate is installed in the center of the fuel stack.

9. The fuel cell of claim 7, further comprising a plurality of heat exchange plates installed in the fuel stack.

10. The fuel cell of claim 9, wherein one of the heat exchange plates is installed at an end of the fuel stack and another of the heat exchange plates is installed at another end of the fuel stack.

11. The fuel cell of claim 7, wherein the heat exchange plate comprises:
    a cooling water storage to temporarily store first cooling water that is circulated in the stack; and
    a second cooling water flow channel that passes through the cooling water storage and through which a second cooling water passes to exchange heat with the first cooling water.

12. The fuel cell of claim 11, wherein the cooling water storage comprises:
   a first cooling water storage through which the second cooling water flow channel passes;
   a second cooling water storage that stores first cooling water cooled by contacting the second cooling water flow channel; and
   a solenoid valve that selectively opens and closes a flow channel connecting the first and second cooling water storages.

13. The fuel cell of claim 12, wherein the heat exchanger is a pair of heat exchange plates installed between end plates of the fuel stack, wherein
   the first cooling water storage is located in one of the pair of heat exchange plates; and
   the second cooling water storage is located in another of the pair of heat exchange plates.

14. The fuel cell of claim 12, further comprising:
   a thermo sensor to measure the temperature of cooling water entering into the heat exchanger; and
   a controller to control the solenoid valve to close the valve when the temperature of the cooling water entering into the heat exchanger is below a first temperature and open the valve when the temperature of the cooling water in the stack is above a second temperature higher than the first temperature.

15. The fuel cell of claim 1, further comprising a waste heat converter to convert the removed heat from the stack to electricity.

16. The fuel cell of claim 1, wherein the heat exchanger is a tube and shell heat exchanger, a plate and frame heat exchanger, or a microchannel heat exchanger.

17. A fuel cell stack comprising:
   at least one built-in heat exchanger to remove waste heat from the fuel cell stack; and
   a cooling plate having a flow channel through which primary and secondary cooling water pass, wherein the heat exchanger circulates cooling water to the cooling plate and the heat exchanger is mounted in an end plate of the fuel cell stack.

18. The fuel cell stack of claim 17, wherein the heat exchanger is installed in at least one of a pair of end plates disposed on ends of the fuel cell stack.

19. The fuel cell stack of claim 17, wherein the at least one heat exchanger is a heat exchanger plate in the fuel cell stack.

* * * * *